Sept. 15, 1925.　　　　　　　　　　　　　　　　　　　　1,553,501
J. BOGDAN ET AL.
CUSHION WHEEL
Filed Feb. 10, 1923　　　　2 Sheets-Sheet 2
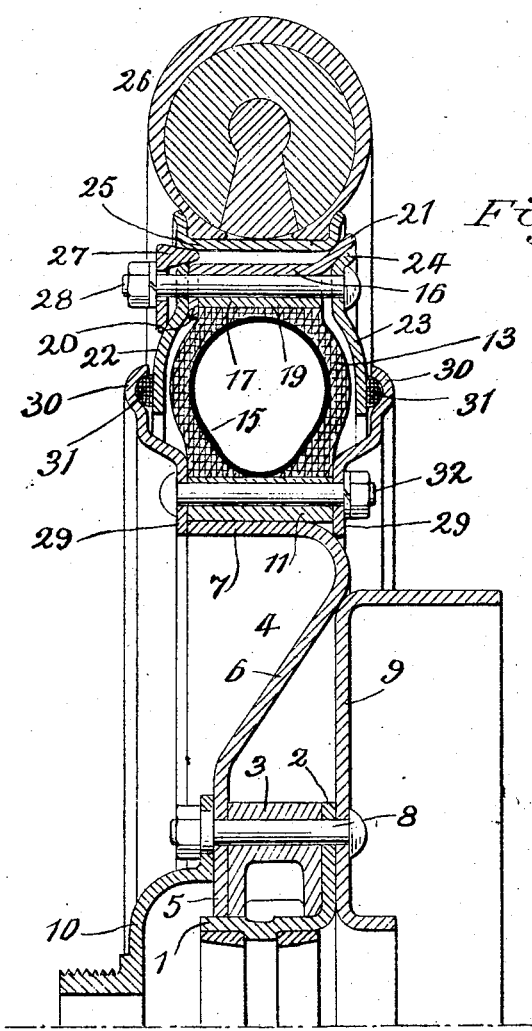
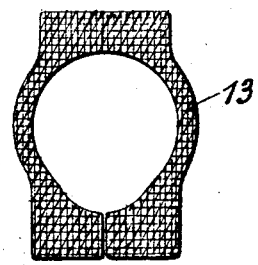
Inventors:
JOHN BOGDAN AND
JOSEPH A. ANGLADA
By his Attorney Patented Sept. 15, 1925.

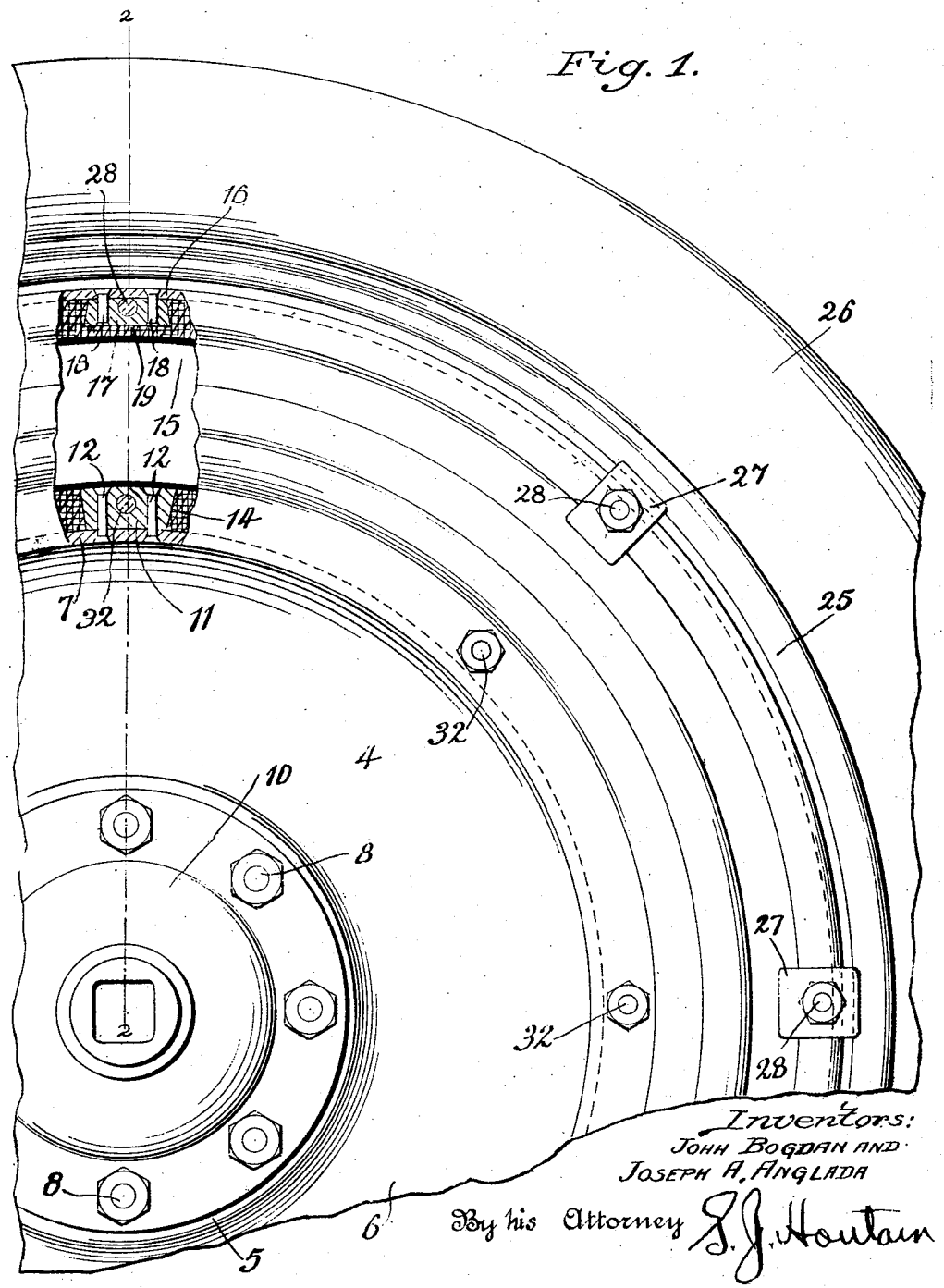

1,553,501

UNITED STATES PATENT OFFICE.

JOHN BOGDAN, OF NEWARK, NEW JERSEY, AND JOSEPH A. ANGLADA, OF JENKINTOWN, PENNSYLVANIA.

CUSHION WHEEL.

Application filed February 10, 1923. Serial No. 618,172.

*To all whom it may concern:*

Be it known that we, JOHN BOGDAN and JOSEPH A. ANGLADA, citizens of the United States, and the said BOGDAN, resident of Newark, county of Essex, and State of New Jersey, and the said ANGLADA residing at Jenkintown, in the county of Montgomery and State of Pennsylvania, have invented certain new and useful Improvements in Cushion Wheels, of which the following is a specification.

The present invention relates to vehicle wheels, having reference particularly to an improved pneumatic cushion-wheel of the disc variety.

The invention has for an object the provision of a wheel of this character which is of such construction as to obviate liability of puncturing its pneumatic element.

A further object of the invention is to provide means for absorbing shock, between the wheel hub and its traction tire.

Still further objects being the provision of an improved vehicle wheel which is simple in construction, durable, inexpensive and relatively light in weight, and which is capable of sustaining considerable lateral impact without liability of serious injury to its several elements.

In the attainment of these and other objects we employ an adaptable hub having a wheel fixed thereto, consisting of a substantially concavo-convex metal disc having a peripheral flange constituting a rim, a peripherally split annular shoe mounted on said rim, a pneumatic tube within said shoe, a felly-band on the outer periphery of said shoe, and means for anchoring said shoe to the outer periphery of said wheel rim and to the inner periphery of said felly-band, and guard-means laterally spaced from said shoe for coincidentally allowing of its lateral expansion and guarding it against injury, and means for detachably connecting the said elements, and other novel features hereinafter fully described and specifically set forth in the appended claims.

In the accompanying drawings forming part of this specification,

Figure 1 is an outside view of a segment of my improved wheel;

Figure 2 is a cross sectional view taken on the line 2—2 of Figure 1; and

Figure 3 is a cross sectional view of the shoe-element.

In the example of the invention illustrated by the drawings, 1, indicates a hub of adaptable standard variety and having on its inner end a flange 2, mounted adjacent to the outer end of the hub 1, and laterally spaced from the flange 2, by means of an annular member 3, is my improved disc-wheel indicated in general by 4, and which comprises a front wall 5, an inwardly and obliquely directed body-part 6 and an annular flange 7, said wheel being held in place by means of bolts 8 which are coincidentally employed for securing a brake-drum 9 and a hub-cap 10.

Mounted peripherally on the outer surface of the flange 7, by means of rivets 12, is a plurality of radially extending dove-tailed tongues 11 which are longitudinally pierced for engaging fastening bolts hereinafter described.

The tongues 11 are adapted for interlocking engagement with dove-tailed grooves 14 formed on the inner periphery of the flexible shoe 13 which encloses the pneumatic elastic tube 15, said shoe being split at its inner periphery, whereby the tube may be inserted.

Mounted on the outer periphery of the shoe 13, is a felly-band 16 having fixed on its inner periphery, by means of rivets 18, a plurality of longitudinally pierced dove-tailed tongues 17 which engage corresponding dove-tailed grooves 19 formed in the outer periphery of the shoe 13. The felly-band 16 is provided on its front edge with a right angularly directed flange 20, and at its rear edge with an obliquely directed flange 21.

We further provide an annular outside guard-plate 22 which is laterally spaced from the shoe 13, to allow for expansion thereof, and which bears at its outer edge part on the flange 20; and an annular inside guard-plate 23 which is also spaced from the shoe 13 and provided with an obliquely directed flange 24, which parallels the flange 21 of the felly-band 16 and bears thereon.

We also employ a demountable tire rim 25, and tire 26, and suitable clips 27 the plates 22, 23, felly-band 16, tire rim 25, and clips 27, being held in fixed relation by means of cross bolts 28 which extend through said elements and through the tongues 17.

As a further means for guarding the shoe 13 and stabilizing the structure, we employ ring-plates 29 which are respectively provided with a beaded edge part 30, constituting an annular groove for containing a suitable packing ring 31. These plates 29 are held in place by means of cross bolts 32 which extend there through and through the tongues 11.

The ring-plates are respectively curved and laterally spaced from the shoe 13 to allow for lateral expansion of said shoe, and the packing rings 31 constitute efficient means for preventing dust from reaching and impairing the pneumatic element.

It is manifest that a wheel constructed as described above embodies the cushion qualities of an ordinary pneumatic tire located on the wheel rim while eliminating the objectionable features thereof, the resiliency of the pneumatic element and the lateral compression spaces between the guard-plates and the shoe allowing the necessary expansion and contraction, and admitting of shock being absorbed by said pneumatic element without liability of having its components injured by puncture.

While we have illustrated and described a fair example of the invention, we do not wish to be understood as confining ourselves to the specific details of mere mechanical construction and formation of the elements set forth, as under the spirit of our invention, we believe that we are entitled to employ such variations of detail as may fall within the scope of the appended claims.

Having thus described our invention, what we claim as new and desire to secure by Letters Patent, is:

1. In a structure of the character described, a hub, and a substantially concavo-convex disc-wheel having a peripheral flange constituting a rim, and a peripherally split annular shoe mounted on said rim, a pneumatic tube within said shoe, a felly-band on the outer periphery of said shoe, and means for anchoring said shoe to the outer periphery of said wheel-rim and to the inner periphery of said felly-band, and guard-means laterally spaced from said shoe and carried by said anchoring means.

2. A vehicle wheel, comprising a substantially concavo-convex disc having a peripheral flange, said flange having on its outer periphery a plurality of tongues, a split flexible shoe having on its inner periphery a plurality of transverse grooves, for interlocking engagement with said tongues, and on its outer periphery a plurality of transverse grooves, and a felly-rim having on its inner periphery a plurality of transverse tongues, said tongues in interlocking engagement with said last named grooves, and detachable guard-means for protecting said shoe.

3. A vehicle wheel, comprising a substantially concavo-convex disc having a peripheral flange, said flange having on its outer periphery a plurality of longitudinally pierced transverse tongues, a split flexible shoe having on its inner periphery a plurality of transverse grooves, for interlocking engagement with said tongues, and on its outer periphery a plurality of transverse grooves, and a felly-rim having on its inner periphery a plurality of longitudinally pierced transverse tongues, said tongues in interlocked engagement with said last named grooves, and detachable guard-means for laterally protecting said shoe, said guard-means comprising an inner and outer annular plate, and bolts for retaining said plates on said tongues of the felly-rim, and auxiliary guard-means comprising an inner and an outer annular plate, and bolts for retaining said plates on the tongues of the wheel rim, said first named guard-means in reciprocative relation with the auxiliary guard-means.

4. In a structure of the character described, a disk wheel having a peripheral laterally extending flange, an annular flexible pneumatic shoe mounted on said flange, a felly-band mounted on the outer periphery of said shoe and dovetail connections between said felly-band and said shoe and between said flange and said shoe.

Signed at Newark in the county of Essex and State of New Jersey July A. D. 1922.

JOSEPH A. ANGLADA.
JOHN BOGDAN.